(12) United States Patent
De Villele et al.

(10) Patent No.: US 10,930,165 B2
(45) Date of Patent: Feb. 23, 2021

(54) ENHANCED FLIGHT EFFICIENCY THROUGH SMART AUTOMATION FOR ON-BOARD WEATHER UPDATE

(71) Applicant: Honeywell International Inc., Morris Plains, NJ (US)

(72) Inventors: Dorthee De Villele, Montjoire (FR); Marek Batelka, Tisnov (CZ); Slavomira Bartovicova, Brno (CZ); Erwan Paricaud, Haute Garonne (FR)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 15/784,993

(22) Filed: Oct. 16, 2017

(65) Prior Publication Data
US 2019/0114931 A1    Apr. 18, 2019

(51) Int. Cl.
*G08G 1/00*    (2006.01)
*G08G 5/00*    (2006.01)
(Continued)

(52) U.S. Cl.
CPC .......... *G08G 5/0091* (2013.01); *B64D 45/00* (2013.01); *G01W 1/10* (2013.01); *G08G 5/0013* (2013.01); *G08G 5/0021* (2013.01); *G08G 5/0026* (2013.01); *G08G 5/0039* (2013.01); *G08G 5/0052* (2013.01); *B64D 2045/0075* (2013.01)

(58) Field of Classification Search
CPC .......... G08G 5/0091; G08G 1/00; G08G 5/00; B64D 45/00; G01C 21/00; G01C 23/00; G01C 21/36; G06G 7/76; G05D 3/00; G01S 13/95
See application file for complete search history.

(56) References Cited

U.S. PATENT DOCUMENTS

| 6,501,392 B2 | 12/2002 | Gremmert et al. |
| 6,977,608 B1 | 12/2005 | Anderson et al. |

(Continued)

FOREIGN PATENT DOCUMENTS

| KR | 20180118440 A | * 10/2018 | ............ G01C 21/36 |

OTHER PUBLICATIONS

Honeywell Aerospace, "Weather Information Service Version 1.2", aerospace.honeywell.com/weather, 2017, pp. 1-2, Publisher: Honeywell International Inc.

(Continued)

*Primary Examiner* — Yuri Kan
(74) *Attorney, Agent, or Firm* — Bookoff McAndrews, PLLC

(57) ABSTRACT

A system and method for enhanced vehicle efficiency through smart automation for an onboard weather update is provided. The system comprises a processor, and a non-transitory processor readable medium including instructions, executable by the processor, to perform a method comprising: receiving vehicle data from an onboard vehicle data source; receiving real-time weather data from one or more weather data sources; detecting when onboard forecast weather data is out-of-date or irrelevant based on the vehicle data and the real-time weather data; estimating one or more potential benefits from an update of the onboard forecast weather data; and activating the update of the onboard forecast weather data.

20 Claims, 6 Drawing Sheets

(51) Int. Cl.
  *G01S 13/95* (2006.01)
  *G01C 21/36* (2006.01)
  *G06G 7/76* (2006.01)
  *B64D 45/00* (2006.01)
  *G01W 1/10* (2006.01)

(56) References Cited

U.S. PATENT DOCUMENTS

| | | | |
|---|---|---|---|
| 7,516,011 B1 * | 4/2009 | Kabel | G01C 21/20 |
| | | | 340/995.19 |
| 7,720,630 B1 | 5/2010 | Miller et al. | |
| 8,332,084 B1 * | 12/2012 | Bailey | G05D 1/0204 |
| | | | 701/10 |
| 8,437,893 B2 | 5/2013 | Mead et al. | |
| 9,558,672 B2 | 1/2017 | McCann et al. | |
| 9,607,520 B2 | 3/2017 | McCann et al. | |
| 9,849,999 B1 * | 12/2017 | Fymat | B64D 45/00 |
| 2009/0043486 A1 * | 2/2009 | Yang | G01C 21/3492 |
| | | | 701/117 |
| 2009/0058682 A1 * | 3/2009 | True | H04L 12/66 |
| | | | 340/971 |
| 2010/0241345 A1 * | 9/2010 | Cornell | G08G 5/0013 |
| | | | 701/120 |
| 2011/0050458 A1 | 3/2011 | Bailey et al. | |
| 2012/0139755 A1 | 6/2012 | Ginsberg | |
| 2013/0085669 A1 | 4/2013 | Bailey et al. | |
| 2016/0019798 A1 | 1/2016 | Agrawal | |
| 2016/0266249 A1 * | 9/2016 | Kauffman | G01S 13/95 |
| 2017/0183105 A1 | 6/2017 | Fournier et al. | |

OTHER PUBLICATIONS

European Search Report in corresponding Application No. 18200278.2, dated Mar. 5, 2019.

* cited by examiner

ENHANCED FLIGHT EFFICIENCY THROUGH SMART AUTOMATION FOR ON-BOARD WEATHER UPDATE

BACKGROUND

Current aviation technology is capable of increasing efficiency of flight operations by optimizing the flight profile and determining the most cost-efficient speeds and altitudes. Higher flight efficiency requires a combination of the aircraft lateral/vertical trajectory with accurate weather information. Achieving optimum and efficient operations can be straight forward during preparation of the flight, but becomes challenging once in flight, where unforeseen weather or route modifications can occur.

There are various technical limitations that prevent achievement of inflight optimization. The current technology often misses accurate flight plan information (e.g., downlink messages contain limited amount of information). In addition, current flight management systems do not support real-time weather such as 3D Grid weather, and the size of wind/temperature uplink messages is limited, thus resulting in inaccuracies of the onboard weather model. Also, a lack of systems connectivity prevents effective responses to unforeseen weather changes along the route, and datalink costs resulting from onboard weather updates can be prohibitive.

SUMMARY

A system and method for enhanced vehicle efficiency through smart automation for an onboard weather update is provided. The system comprises a processor, and a non-transitory processor readable medium including instructions, executable by the processor, to perform a method comprising: receiving vehicle data from an onboard vehicle data source; receiving real-time weather data from one or more weather data sources; detecting when onboard forecast weather data is out-of-date or irrelevant based on the vehicle data and the real-time weather data; estimating one or more potential benefits from an update of the onboard forecast weather data; and activating the update of the onboard forecast weather data.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1A:
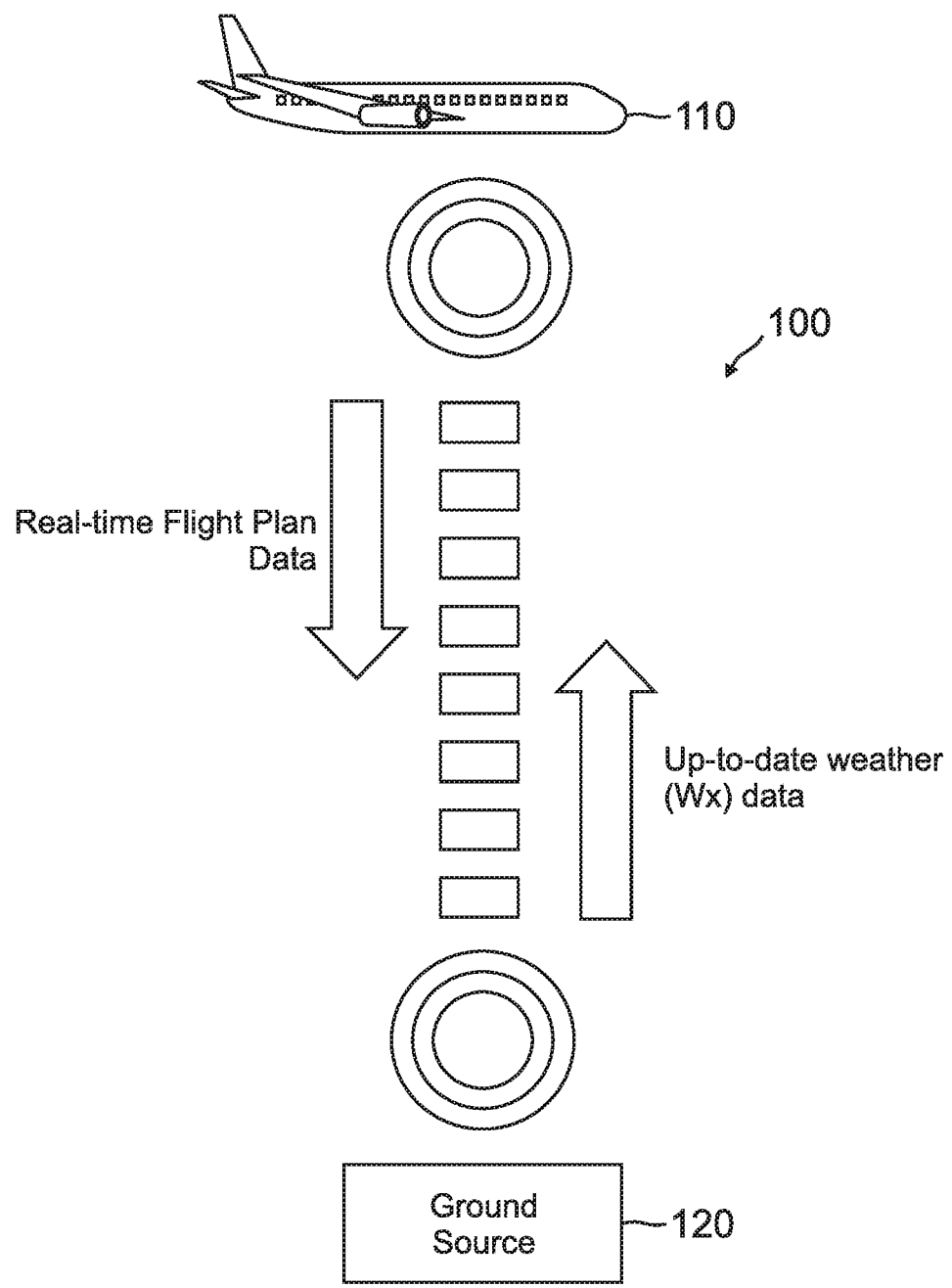
FIGS. 1A and 1B are diagrammatic representations of a system for enhanced efficiency through smart automation for an onboard weather update, according to an exemplary implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method of enhancing vehicle efficiency through smart automation for onboard weather updates are disclosed herein. The system and method provide functionality that allows smart and optimized combinations of real-time vehicle data, such as flight plan data, with live weather data, such as 4Dimensional Meteorological (4DM) data, 3D Grid weather (Wx) data, crowd sourced weather data, or connected weather data, in order to estimate benefits that could result from updates of the onboard forecast weather data. If beneficial, the onboard weather forecast data can then be updated, either automatically or by a user such as a vehicle crew member or ground dispatcher.

The present system and method can be implemented for various vehicles, including airborne vehicles such as various types of aircraft, such as manned aircraft, unmanned aerial vehicles (UAVs), and the like, as well as ground-based vehicles such as cars, trucks, and the like.

In one implementation, the present approach provides up-to-date weather data for enhancing inflight efficiency of aircraft by combining real-time aircraft flight plan data (e.g., lateral and vertical routes, time schedules, and onboard weather data) with live weather data, such as 4DM data, 3D Grid Wx data, crowd sourced weather data, or connected weather data, in order to detect when onboard forecast weather is either out-of-date or irrelevant. The benefits that could result from updates of the onboard weather data are then estimated, which can be in terms of fuel saving and/or time accuracy, for example. For dispatchers, this information can be provided for all aircrafts under his/her responsibility, with dedicated cues to display the benefits, and highlights when medium/high benefits can be achieved.

The user is then allowed to update onboard weather data through automatic or manual generation and uplink of relevant information, such as predicted wind information (PWI) messages, predicted wind modification (PWM) messages, or the like. Alternatively, the user can update onboard weather data through automatic or manual generation and upload of relevant weather data to an electronic flight bag (EFB) application, enabling compressed/reduced data size. The EFB application can then use the up-to-date weather data to: generate PWI/PWM messages, or the like; allow the pilot to view these data (and eventually modify the data); and if allowed by the onboard technology, send the PWI/PWM messages to a flight management system (FMS). Otherwise, manual pilot entry of the updated data is needed.

The present method can also be implemented to automatically perform the update of the onboard weather data whenever benefits are higher than a user-defined threshold. In addition, the method also allows for restricting the weather update to specific flight segments where most of the benefits are evaluated.

Logic used to implement the present method can be located in a FMS, EFB, ground server, the cloud, or the like.

The present approach provides various benefits, including: enhanced inflight efficiency of an aircraft, through determination of real-time cost efficient speeds and altitudes, as well as calculation of a cost-efficient descent profile for the aircraft; improved on-time performance as accuracy of the forecast weather allows accurate and reliable time predictions; reductions in crew and dispatcher workloads; reduced datalink costs through optimization of weather data exchanges, as only required and useful data will be uplinked; and flight rerouting capabilities.

The present method can also be implemented to provide up-to-date weather data to onboard systems hosting an optimum speed/altitude engine (e.g., EFB, FMS, or the like). Having accurate weather data in the FMS, for example, can provide additional benefits by ensuring accurate fuel predictions (hence crew confidence) and accurate time predictions.

Further details of the present system and method are described hereafter with reference to the drawings.

Figure 1B:
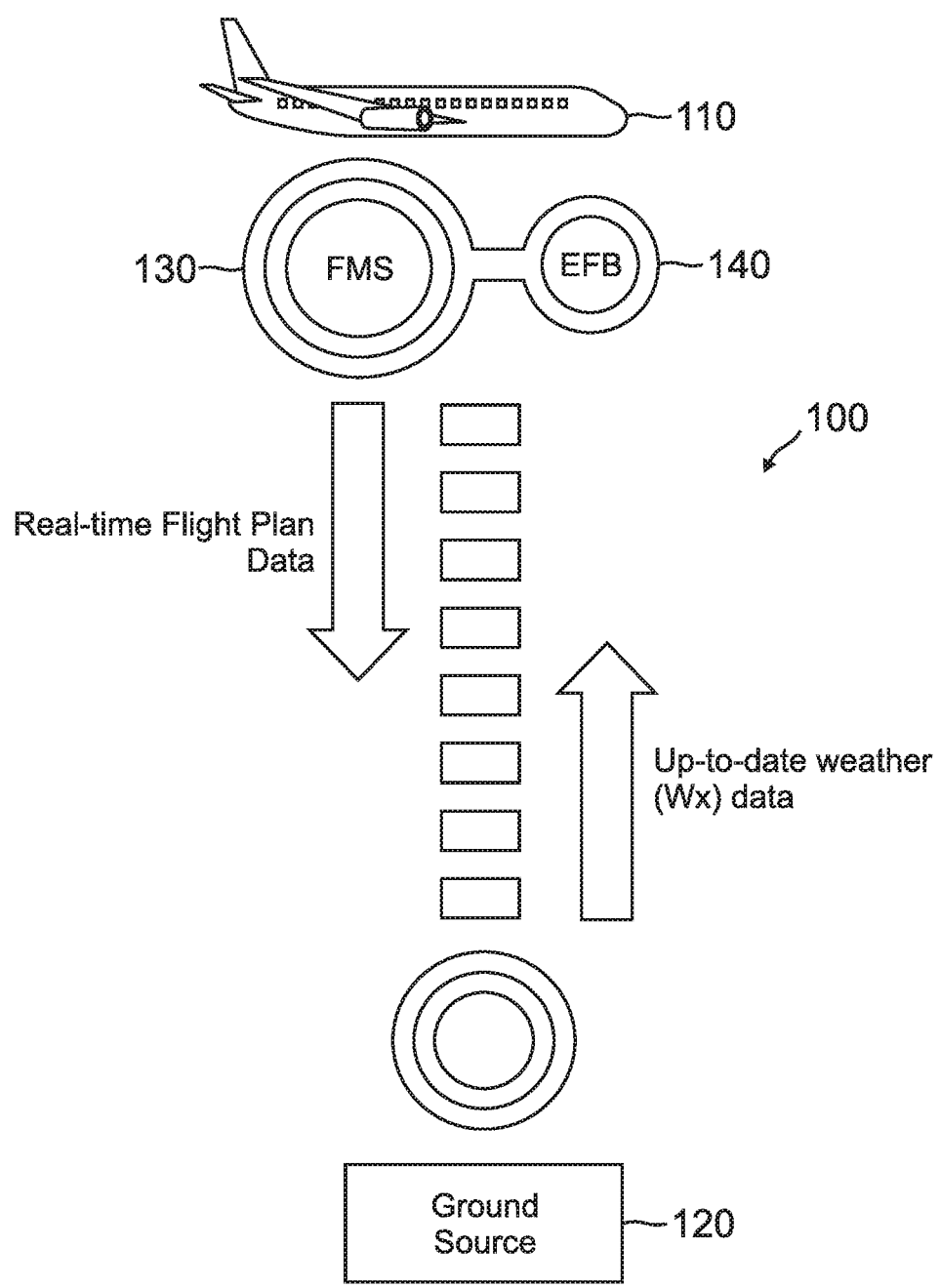

FIGS. 1A and 1B are general diagrammatic representations of a system 100 for enhanced efficiency through smart automation for an onboard weather update, according to an exemplary implementation. The system 100 is generally implemented using real-time flight plan data from an aircraft 110, and up-to-date weather (Wx) data from a ground source 120. This information is used by system 100 to detect when onboard forecast weather data is out-of-date or irrelevant, and to estimate the potential benefits of updating the onboard forecast weather data. The system 100 then selects relevant weather data along the flight plan for the update, and provides compression of the weather data update as needed. An automatic uplink of the weather data update is then sent to aircraft 110. FIG. 1B illustrates that system 100 can be operated through an FMS 130, an EFB application 140, or both, onboard aircraft 110. Alternatively, system 100 can be operated using an on-ground or cloud computing service.

Figure 2:
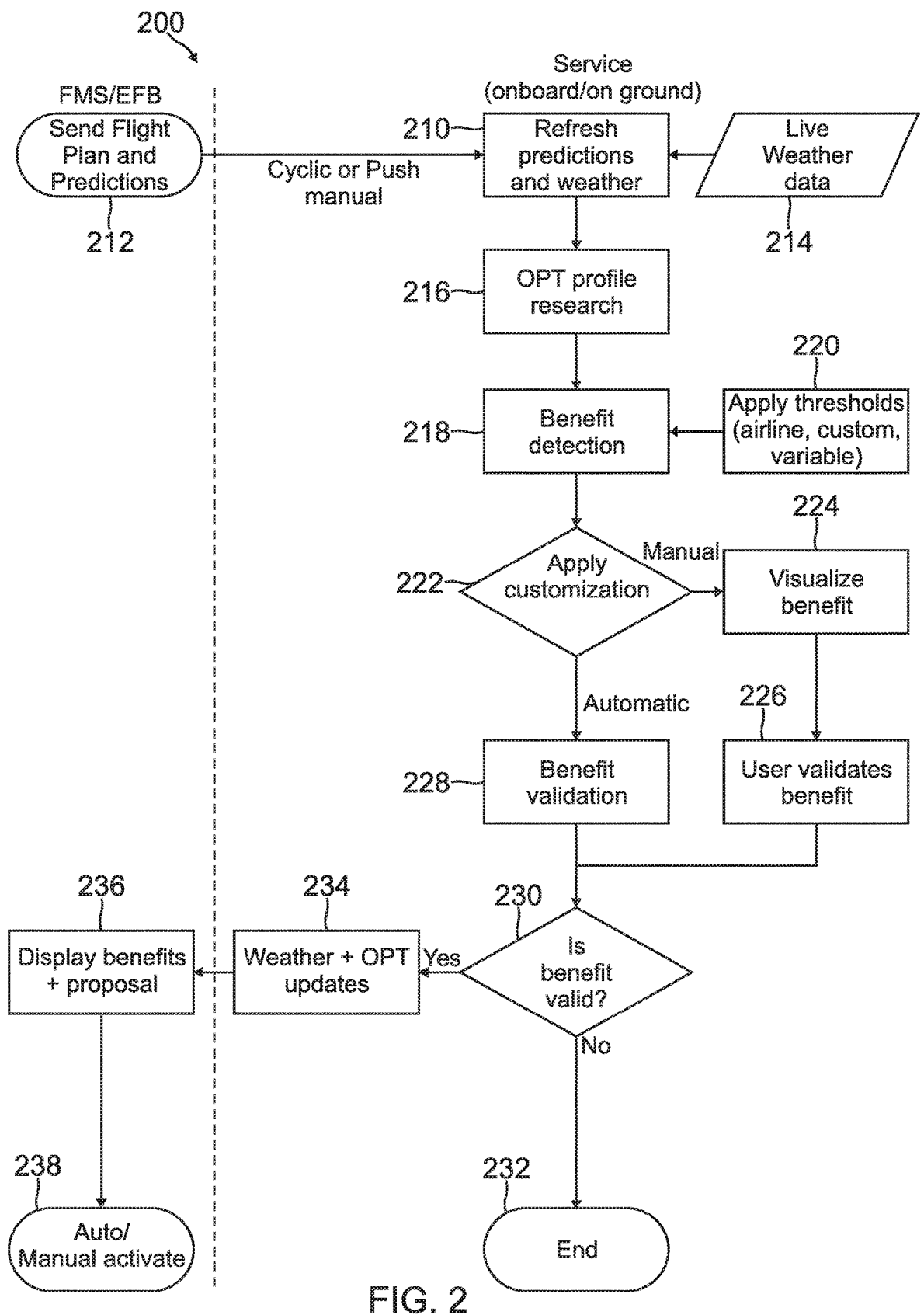
FIG. 2 is a flow diagram of an exemplary operational method for enhancing vehicle efficiency, according to one approach.

FIG. 2 is a flow diagram of an exemplary operational method 200 for enhancing vehicle efficiency, such as flight efficiency. The method 200 can be operated as part of an onboard service, or as part of an on-ground or cloud service.

Initially, method 200 refreshes predictions and weather (block 210) based on a flight plan and predictions, sent from an onboard vehicle data source such as a FMS or EFB (either cyclically or through a push manually) (block 212), and live weather data such as 3D grid weather data (block 214). The method 200 then performs optimization (OPT) profile research (block 216) to determine whether onboard forecast data is out-of-date or irrelevant. A benefit detection is then performed (block 218) to estimate the potential benefits of updating the onboard forecast weather data, based on one or more applied thresholds (e.g., airline, custom, variable) (block 220).

A determination is then made whether to apply customization manually or automatically (block 222). If manual customization is applied, then the benefit is visualized (block 224) such as on a user display, and the user is allowed to validate the benefit (block 226). If automatic customization is applied, then benefit validation take places without any user input (block 228). A determination is made whether the benefit is valid, either manually or automatically (block 230). If the benefit is not valid, method 200 comes to an end (block 232). If the benefit is determined to be valid, weather and optimization updates are selected (block 234), and sent to the onboard FMS or EFB. An onboard display then shows a benefits and optimization proposal (block 236), which can then be automatically or manually activated (block 238).

Figure 3:
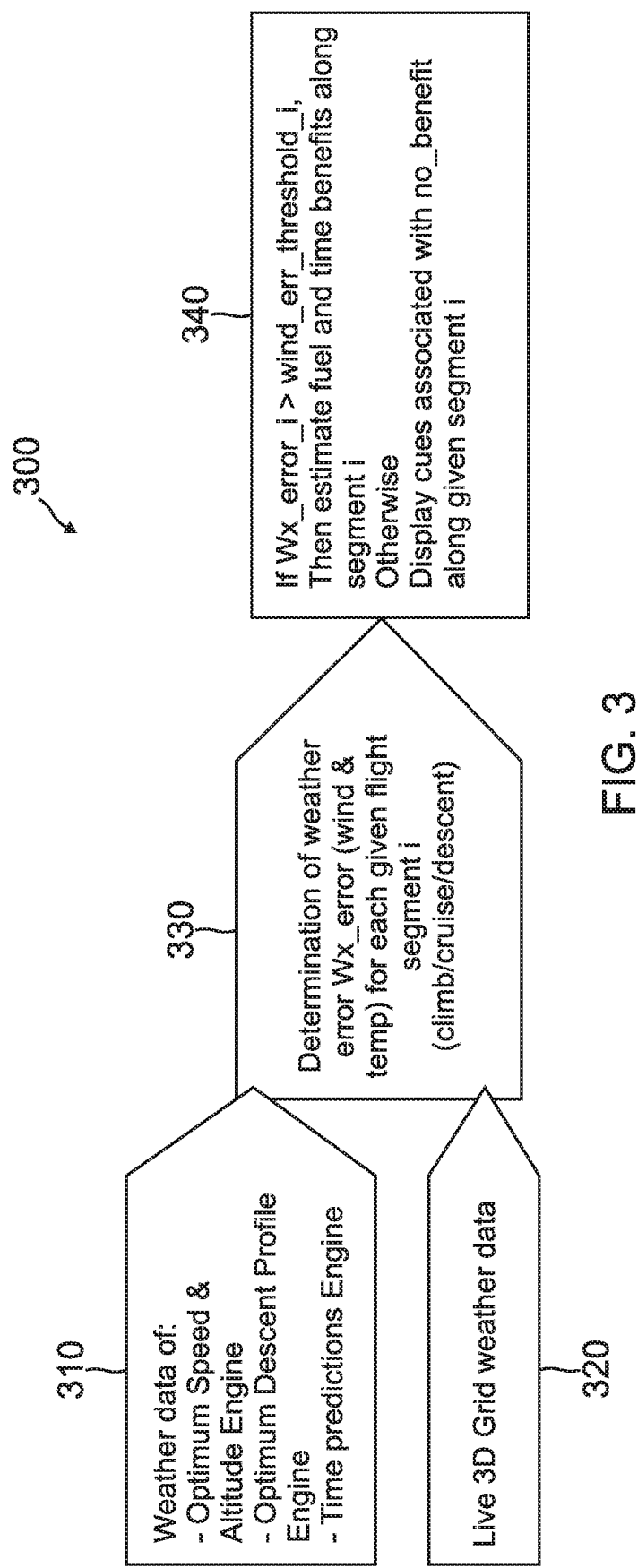
FIG. 3 is a block diagram of an exemplary scheme for detecting when onboard weather data is out-of-date or irrelevant.

FIG. 3 is a block diagram showing further details of an exemplary scheme 300 for detecting when onboard weather data is out-of-date or irrelevant. As shown, onboard inputs (block 310), such as from an FMS or EFB, and ground inputs (block 320) are utilized for scheme 300. The onboard inputs include weather data of an optimum speed and altitude engine, an optimum descent profile engine, and a time predictions engine, for example. The ground inputs include live weather data, such as live 3D Grid weather data. The onboard inputs and ground inputs are used in the determination of weather error, Wx_error (e.g., wind and temperature), for each given flight segment i (e.g., climb, cruise, descent) (block 330). For example, if the weather error is greater than a wind error threshold for a given segment (if $Wx\_error\_i > wind\_err\_threshold\_i$), then the method goes on to the next step of estimating benefits, such as fuel and time benefits, along that segment. Otherwise, the method displays cues associated with no benefit along the given segment. (block 340).

Figure 4:
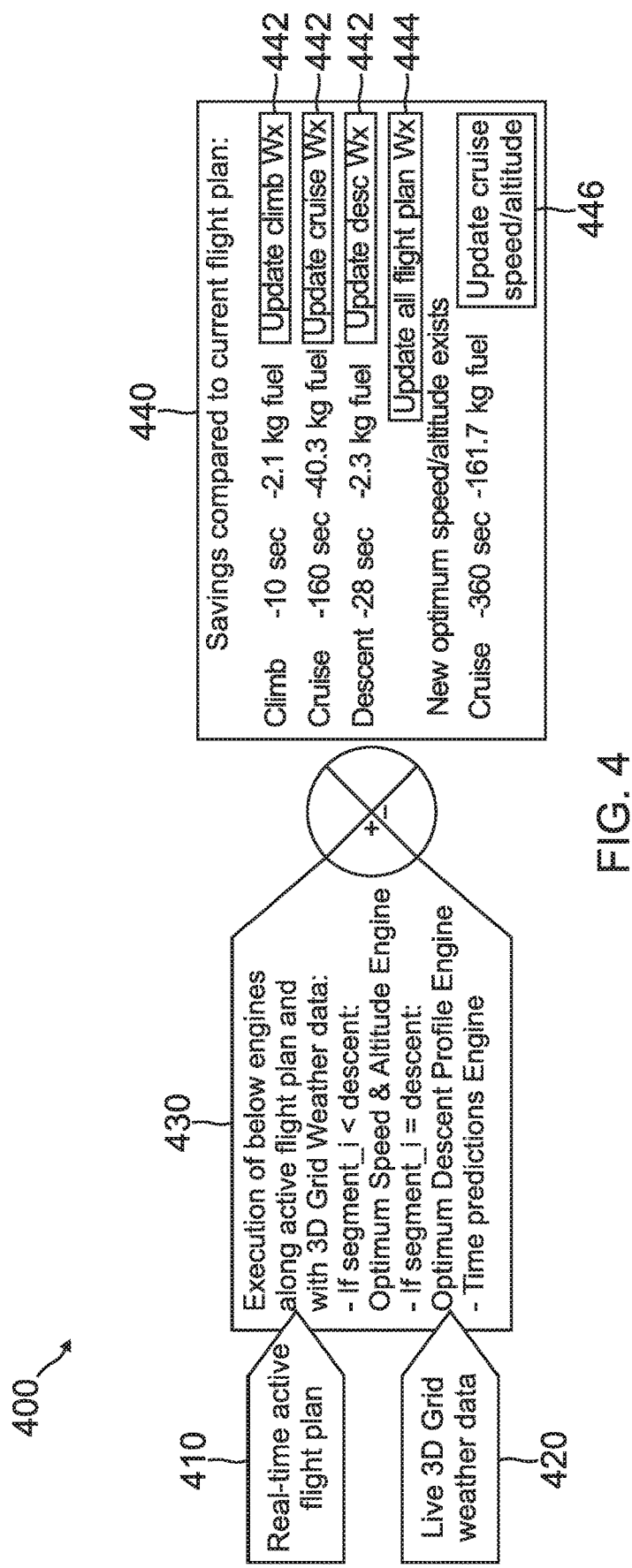
FIG. 4 is a block diagram of an exemplary scheme for estimating the benefits resulting from updates of the onboard weather data.

FIG. 4 is a block diagram showing further details of an exemplary scheme 400 for estimating the benefits that could result from updates of the onboard weather data. The estimation of benefits can be in terms of fuel saving and/or time accuracy, and accounts for updated optimum speed/altitudes, for example. As shown, onboard inputs including a real-time active flight plan (block 410), and ground inputs of live 3D Grid weather data (block 420), are utilized for scheme 400. The onboard inputs and ground inputs are used in the execution of the following engines, along the active flight plan (or any secondary flight plans) and with the 3D Grid weather data: if segment_i<descent: optimum speed and altitude engine; if segment_i=descent: optimum descent profile engine; and the time predictions engine (block 430). The savings of the estimated benefits compared to the current flight plan is then displayed to the user for the different flight segments (climb, cruise, descent) (block 440).

The user (crew or dispatcher) is allowed to update the onboard weather data. For example, the user can generate and upload weather data associated to each individual flight segment (climb/cruise/descent) (blocks 442). The user can also generate and upload weather data along the complete flight plan (block 444). The user can additionally update the optimum speeds/altitudes (block 446).

In one example embodiment, color determination can be employed as part of the display for the user. For example, a GREEN message color can indicate a low savings cost compared to the transaction cost; an AMBER message color can indicate a medium savings cost; a WHITE message color can indicate information is already updated; and a RED message color can indicate that the user should update the data because of high benefits.

The present method also provides for smart selection of relevant weather data surrounding a real-time flight plan (vertical and lateral trajectories) to produce an accurate weather model. For climb and descent flight segments, the method selects altitudes based on relevant weather points (e.g., wind direction change, wind magnitude change, tropopause altitude, etc.) to allow accurate 2D modelization of actual weather. For cruise flight segments, the method selects altitudes and waypoints based on relevant weather points such as wind points, and optimizes updates with respect to planned steps. Elapsed time to reach the weather points is also considered.

Figure 5:
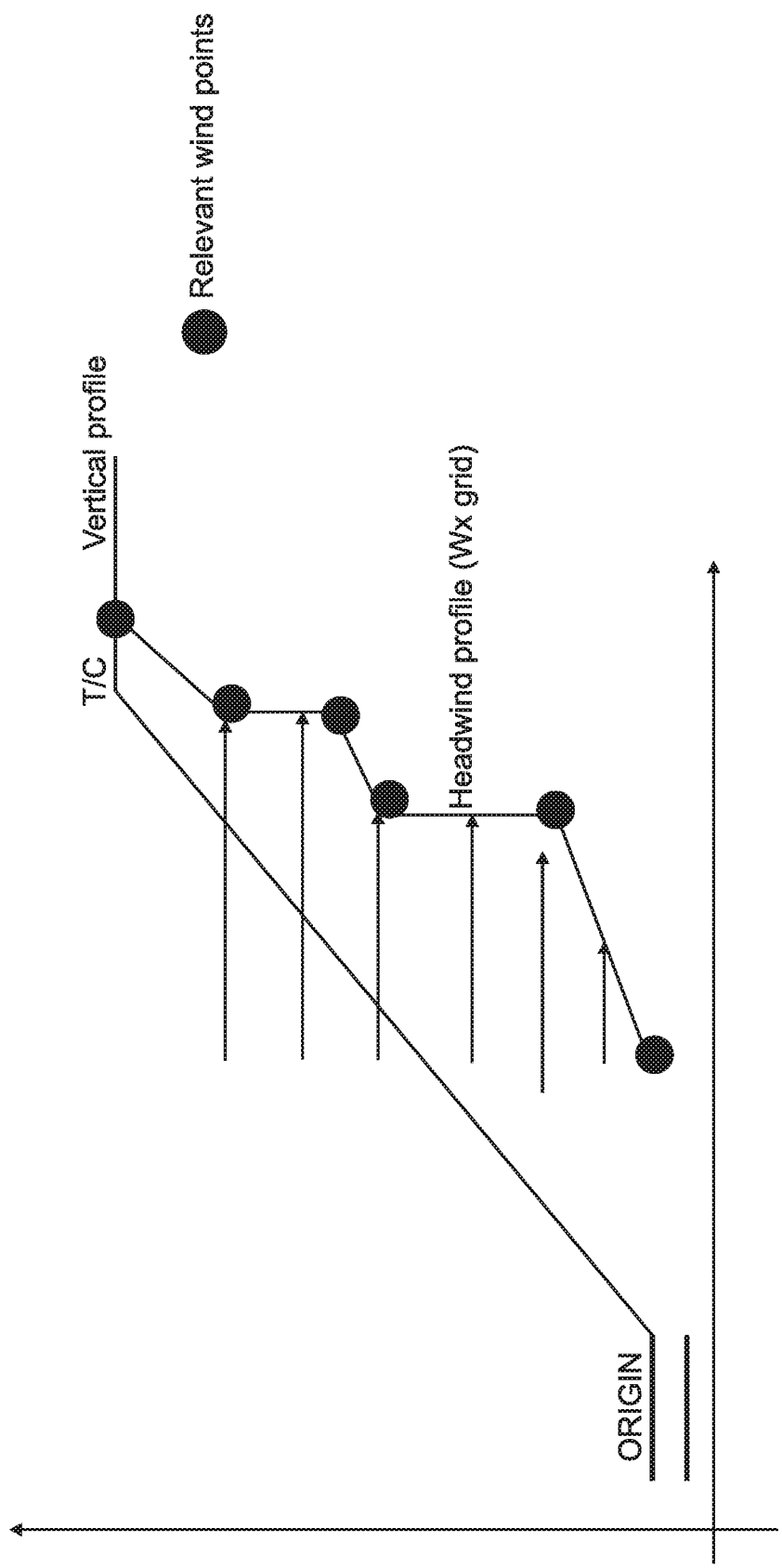
FIG. 5 is a graph showing the determination of relevant wind points for a climb segment.

An example of the determination of relevant wind points for a climb segment is shown in the graph of FIG. 5. The relative wind points are automatically analyzed with respect to a vertical profile and a headwind profile (Wx grid), between an origin and T/C. The graph of FIG. 5 can be used to perform an automatic selection of flight levels of interest by a fitting algorithm. For example, based on a delta change of wind/temperature, a maximum delta between two flight levels can be determined.

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for enhanced vehicle efficiency through smart automation for an onboard weather update, the system comprising a processor; and a non-transitory processor readable medium including instructions, executable by the processor, to perform a method comprising: receiving vehicle data from an onboard vehicle data source; receiving real-time weather data from one or more weather data sources; detecting when onboard forecast weather data is out-of-date or irrelevant based on the vehicle data and the real-time weather data; estimating one or more potential benefits from an update of the onboard forecast weather data; and activating the update of the onboard forecast weather data.

Example 2 includes the system of Example 1, wherein the processor is located onboard a vehicle, in a ground center, or as part of a cloud service.

Example 3 includes the system of Example 2, wherein the vehicle is an aircraft.

Example 4 includes the system of Example 3, wherein the onboard vehicle data source comprises a flight management system, or an electronic flight bag (EFB) application.

Example 5 includes the system of any of Examples 1-4, wherein the vehicle data comprises a real-time active flight plan.

Example 6 includes the system of any of Examples 1-5, wherein the real-time weather data comprises 4dimensional meteorological (4DM) data, 3D grid weather data, crowd sourced weather data, or connected weather data Example 7 includes the system of any of Examples 1-6, wherein the update of the onboard forecast weather data is activated by a user.

Example 8 includes the system of Example 7, wherein the user is a vehicle crew member or a ground dispatcher.

Example 9 includes the system of any of Examples 1-8, wherein the update of the onboard forecast weather data is automatically activated based on a user-defined threshold.

Example 10 includes the system of any of Examples 1-9, wherein the estimated potential benefits include fuel savings, time accuracy, optimum speed, or optimum altitude.

Example 11 includes the system of any of Examples 1-10, wherein the estimated potential benefits are automatically associated with cost-efficient updates that are sent to a display.

Example 12 includes the system of Example 11, wherein the cost-efficient updates include selection of relevant weather data along a flight plan.

Example 13 includes the system of Example 12, wherein the cost-efficient updates further include cost-efficient speeds and altitudes associated with the relevant weather data.

Example 14 includes a method for enhanced vehicle efficiency through smart automation for an onboard weather update, the method comprising: receiving vehicle data from an onboard vehicle data source; receiving real-time weather data from one or more weather data sources; detecting when onboard forecast weather data is out-of-date or irrelevant based on the vehicle data and the real-time weather data; estimating one or more potential benefits from an update of the onboard forecast weather data; and activating the update of the onboard forecast weather data.

Example 15 includes the method of Example 14, wherein the vehicle data is aircraft data; and the onboard vehicle data source comprises a flight management system, or an electronic flight bag (EFB) application.

Example 16 includes the method of any of Examples 14-15, wherein the vehicle data comprises a real-time active flight plan; and the real-time weather data comprises 4DM data, 3D grid weather data, crowd sourced weather data, or connected weather data.

Example 17 includes the method of any of Examples 14-16, wherein the update of the onboard forecast weather data is activated by a user.

Example 18 includes the method of any of Examples 14-17, wherein the update of the onboard forecast weather data is automatically activated based on a user-defined threshold.

Example 19 includes the method of any of Examples 14-18, wherein the estimated potential benefits are automatically associated with cost-efficient updates that are sent to a display.

Example 20 includes the method of Example 19, wherein the cost-efficient updates include selection of relevant weather data along a flight plan; wherein the cost-efficient updates further include cost-efficient speeds and altitudes associated with the relevant weather data.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for enhanced vehicle efficiency through smart automation for an onboard weather update, the system comprising:
   a processor; and
   a non-transitory processor readable medium including instructions, executable by the processor, to perform a method comprising:
      receiving vehicle data from an onboard vehicle data source;
      receiving real-time weather data from one or more weather data sources;
      for at least one segment of a plurality of segments of a vehicle travel path, detecting when forecast weather data onboard the vehicle is out-of-date or irrelevant based on the vehicle data and the real-time weather data;
      estimating, based on the real-time weather data and the vehicle data, one or more potential benefits of updating the forecast weather data onboard the vehicle for the at least one segment of a plurality of segments of the vehicle travel path; and
      updating, based on the estimation of the one or more potential benefits, the forecast weather data onboard the vehicle to the real-time weather data for the at least one segment of a plurality of segments of the vehicle travel path.

2. The system of claim 1, wherein the vehicle is an aircraft.

3. The system of claim 2, wherein the onboard vehicle data source comprises a flight management system, or an electronic flight bag (EFB) application.

4. The system of claim 1, wherein the vehicle data comprises a real-time active flight plan.

5. The system of claim 1, wherein the real-time weather data comprises 4dimensional meteorological (4DM) data, 3D grid weather data, crowd sourced weather data, or connected weather data.

6. The system of claim 1, wherein the update of the onboard forecast weather data is activated by a user.

7. The system of claim 1, wherein the update of the onboard forecast weather data is automatically activated based on the one or more potential benefits being greater than a threshold.

8. The system of claim 7, wherein the estimated potential benefits include fuel savings, time accuracy, optimum speed, or optimum altitude.

9. The system of claim 1, wherein the estimated potential benefits are automatically associated with cost-efficient updates that are sent to a display.

10. The system of claim 9, wherein the cost-efficient updates further include cost-efficient speeds and altitudes associated with the relevant weather data.

11. A method for enhanced vehicle efficiency through smart automation for an onboard weather update, the method comprising:
   receiving vehicle data from an onboard vehicle data source;
   receiving real-time weather data from one or more weather data sources;
   detecting when forecast weather data onboard the vehicle is out-of-date or irrelevant based on the vehicle data and the real-time weather data;
   estimating, based on the real-time weather data and the vehicle data, one or more potential benefits of updating the forecast weather data onboard the vehicle for the at least one segment of a plurality of segments of the vehicle travel path; and
   updating, based on the estimation of the one or more potential benefits, the forecast weather data onboard the vehicle to the real-time weather data for the at least one segment of a plurality of segments of the vehicle travel path.

12. The method of claim 11, wherein:
   the vehicle data is aircraft data; and
   the onboard vehicle data source comprises a flight management system, or an electronic flight bag (EFB) application.

13. The method of claim 11, wherein:
   the vehicle data comprises a real-time active flight plan; and
   the real-time weather data comprises 4dimensional meteorological (4DM) data, 3D grid weather data, crowd sourced weather data, or connected weather data.

14. The method of claim 11, wherein the update of the onboard forecast weather data is activated by a user.

15. The method of claim 11, wherein the update of the onboard forecast weather data is automatically activated based on the one or more potential benefits being greater than a threshold.

16. The method of claim 11, wherein the estimated potential benefits are automatically associated with cost-efficient updates that are sent to a display.

17. The method of claim 16, wherein the cost-efficient updates include selection of relevant weather data along a flight plan, and wherein the cost-efficient updates further include cost-efficient speeds and altitudes associated with the relevant weather data.

18. The system of claim 1, wherein the updating step is limited to one or more segments of the plurality of segments in which most of the one or more potential benefits are estimated.

19. The system of claim 1, wherein the method further comprises determining whether the one or more potential benefits are valid.

20. The system of claim 1, wherein detecting when forecast weather data onboard the vehicle is out-of-date or irrelevant includes determining a weather error and comparing the weather error to a threshold.

* * * * *